(No Model.) 2 Sheets—Sheet 1.
G. R. & J. W. BROWN.
MACHINE FOR DISTRIBUTING POISON ON PLANTS.
No. 397,626. Patented Feb. 12, 1889.
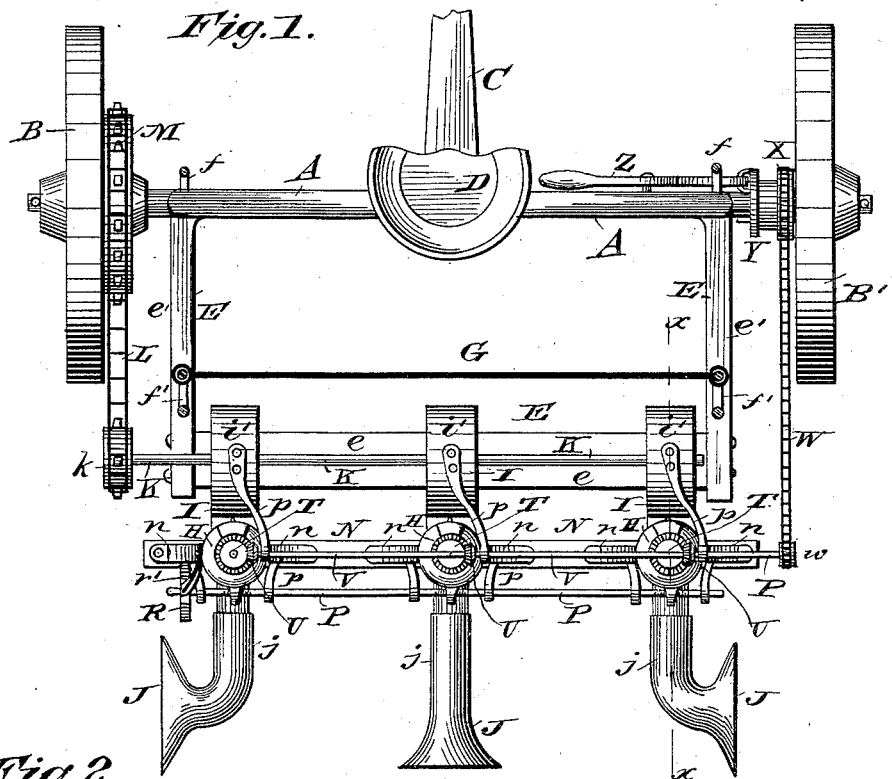
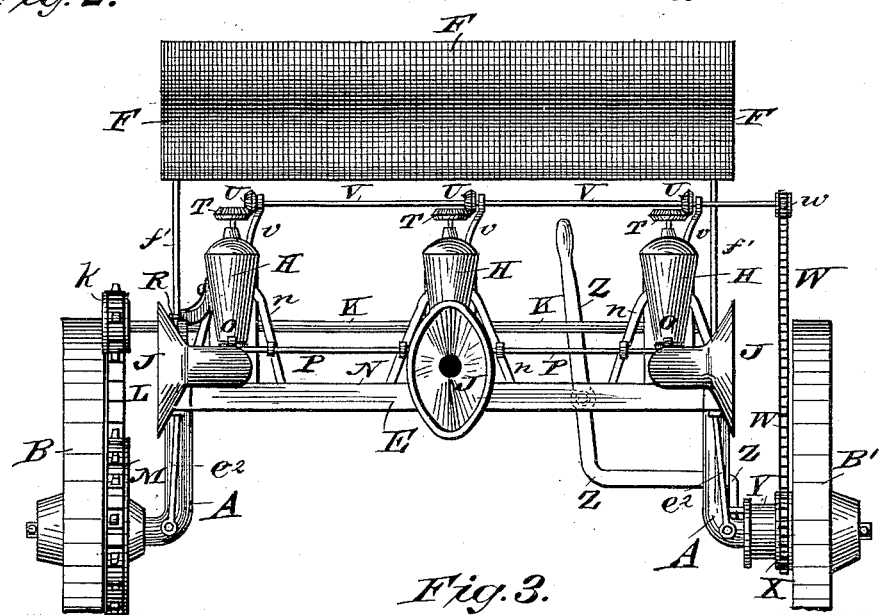
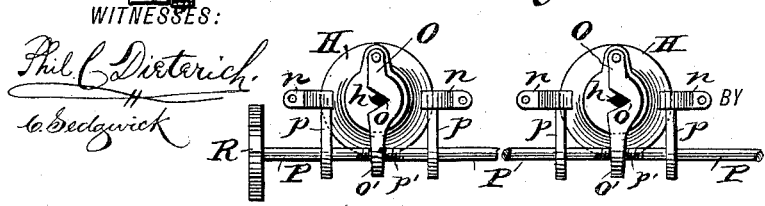
WITNESSES:
Phil C. Dieterich
C. Sedgwick
INVENTOR,
G. R. Brown
J. W. Brown
BY Munn & Co.
ATTORNEY.

(No Model.) 2 Sheets—Sheet 2.
G. R. & J. W. BROWN.
MACHINE FOR DISTRIBUTING POISON ON PLANTS.
No. 397,626. Patented Feb. 12, 1889.
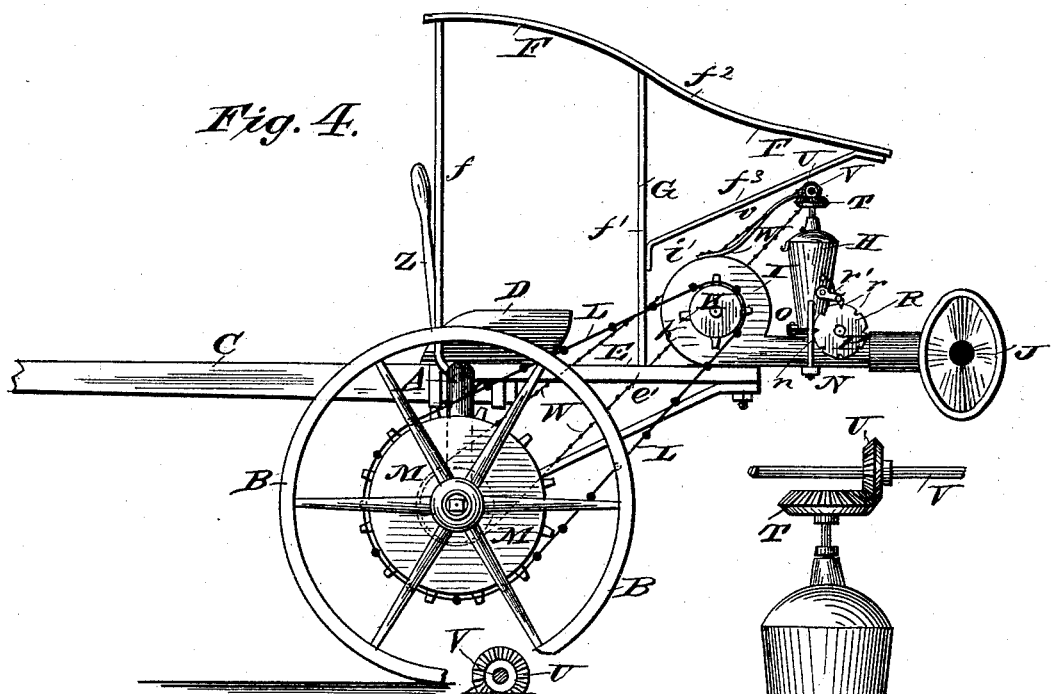
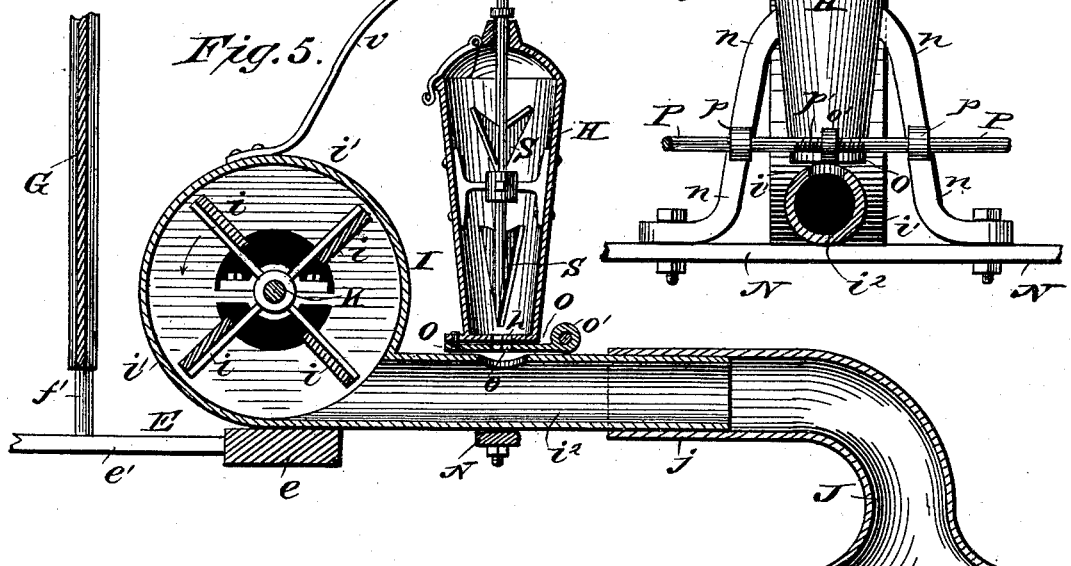
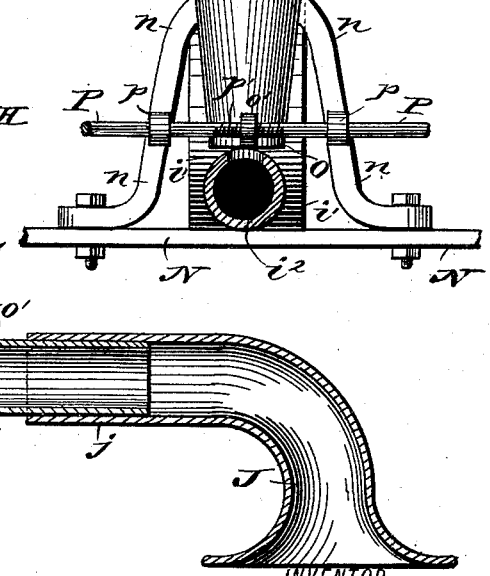
WITNESSES:
Phil. C. Dieterich
C. Sedgwick
INVENTOR.
G. R. Brown
J. W. Brown
BY Munn & Co.
ATTORNEY.

UNITED STATES PATENT OFFICE.

GEORGE R. BROWN AND JOHN W. BROWN, OF PLEDGER, TEXAS.

MACHINE FOR DISTRIBUTING POISON ON PLANTS.

SPECIFICATION forming part of Letters Patent No. 397,626, dated February 12, 1889.

Application filed July 2, 1888. Serial No. 278,764. (No model.)

*To all whom it may concern:*

Be it known that we, GEORGE R. BROWN and JOHN W. BROWN, of Pledger, in the county of Matagorda and State of Texas, have invented a new and Improved Machine for Distributing Poisonous Powders on Plants, of which the following is a full, clear, and exact description.

Our invention relates to a machine for distributing or dusting poisonous powders onto growing plants to rid them of destructive insects; and the invention has for its object to provide a simple and efficient machine of this character.

The invention involves features of construction whereby the driver or attendant is protected from inhaling the poisons discharged from the machine, and whereby, also, direct currents or blasts of air are utilized to carry the poison to and through the plants, and whereby, also, a positive feed or discharge of the poison in regulated quantities or volume controllable at the will of the attendant is assured.

Reference is to be had to the accompanying drawings, forming a part of this specification, in which similar letters of reference indicate corresponding parts in all the figures.

Figure 1 is a plan view of our improved poison-distributer with the draft-pole of the machine broken away and the protecting-screen for the driver in horizontal section. Fig. 2 is a rear view with the machine-wheels partly broken away and part of the driver's screen removed. Fig. 3 is an enlarged detail under side view of a few of the poison-hoppers, their valves, and the shaft mechanism by which the valves of all the hoppers are operated simultaneously. Fig. 4 is a side elevation of the machine, partly broken away. Fig. 5 is an enlarged vertical sectional side elevation, taken on the line $x$ $x$ in Fig. 1, but with the adjustable flaring nozzle turned for a direct downward discharge of the poison therefrom; and Fig. 6 is a detail rear elevation of one of the poison-hoppers, the fan-case, and the discharge-pipe, the latter being in cross-section.

The operating parts of the machine are mounted on a sulky consisting of an axle, A, preferably arched at its central parts to pass over plants readily, opposite wheels, B B', journaled at opposite ends of the axle, a draft-tongue, C, a driver's seat, D, over the axle, and a frame, E, consisting of two rearwardly-extending side bars, $e'$ $e'$, connected to the axle at their forward ends and connected to each other at their rear ends by a cross-bar, $e$, the back end of the frame being braced to the axle at each end of it by rods or bars $e^2$, thus making a light but strong sulky structure.

The main frame E carries a driver's screen, which consists of a rod-frame made with upright rods $f f'$, and an upper rod, $f^2$, which extends rearwardly from the rod $f'$ and is braced to it by a rod, $f^3$. These rods $f f'$ $f^2$ $f^3$ are duplicated at each side of the main frame and are or may be connected by any suitable cross rods or bars, and over this rod-frame is stretched an upper screen fabric, F, and a vertical screen fabric, G, which latter is just behind the driver when he is on the seat D, and the front half or portion of the upper fabric, F, extends over his head to protect him from the sun, while both fabrics, F G, protect the driver from the poisonous dust which is distributed from and by mechanism behind the screen fabric G, and mainly under the rear part of the fabric F, and arranged as next described.

It will be understood that the machine may be built with but one poison-hopper, H, and communicating fan-blast apparatus I, and discharge-nozzle J; but we prefer to arrange a series of three hoppers, blast-fans, and nozzles on the machine, as shown in the drawings. The casings $i'$ of the air-blast fans $i$ are fixed in any suitable manner to the rear cross-bar, $e$, of the main frame E, and have outlet pipes or tubes $i^2$, onto the rear ends of which the nozzles J are fitted by their rear ends forming sleeves $j$, loose enough on or in the pipes $i^2$ to allow the nozzles to be turned to set their flaring or trumpet-shaped ends to face any desired direction, either to the sides, as shown in Figs. 1, 2, and 4 of the drawings, at the two outer-bent nozzles, or directly backward from a straight-bodied nozzle, as shown at the center nozzle in Figs. 1 and 2 of the drawings, or the outer nozzles may be turned to discharge directly downward, as shown in Fig. 5 of the drawings. It is obvious that the nozzles may be differently shaped or positioned to discharge the poison from them in any direction, as the nature or size of the plants onto which the poison is to be dusted may require.

All three of the fans $i$ are fixed to the same shaft, K, which at one end carries a sprocket-wheel, $k$, from which a driving-chain, L, passes to a larger sprocket-wheel, M, fixed to the sulky-wheel B, and whereby a rapid rotation will be given the fans by the advance of the machine to cause an effective air-blast rearward to and through the nozzles J. The sprocket-wheel M may be arranged so that it may be readily disconnected from the wheel B, to allow the fans to remain at rest while the machine is going to and from the place of use and allow connection of said wheels B M, when in the field where the poison is to be distributed.

A hopper, H, is arranged over the outlet-pipe $i^2$ of each of the fan-casings, said hoppers having support from a cross-bar, N, which is fastened to and below the pipes $i^2$, and from which braces $n$ $n$ extend upward to each side of each hopper. A valve, O, pivoted at one end so as to be laterally movable beneath each hopper, has an opening, $o$, which may be brought to coincide more or less fully with a hole, $h$, in the bottom of the poison-hopper H above it to regulate the discharge of the poison from the hopper into the air-blast pipe $i^2$ of the fan. When we employ a series of hoppers and fans, as shown in the drawings, we prefer to operate the poison-discharge regulating-valves O of all the hoppers simultaneously, and we accomplish this by employing a worm-shaft, P, which is journaled in suitable bracket-bearings, $p$, fixed preferably to the hopper-supports $n$, and having screw-threaded portions $p'$, which engage internally-threaded eyes $o'$ at the back ends of the valve O, and whereby when a hand-wheel, R, at one end of the worm-shaft is turned, the shaft will be rotated to shift the valves O and open the poison-discharge outlets of all the hoppers to a like extent for escape of the poison into the air-blast pipes of the fans. The valves of all the hoppers may of course be closed simultaneously to cut off discharge of poison from the hoppers by operating the worm-shaft.

It is obvious that the poison dropped from the hoppers into the pipes $i^2$ will receive direct blasts of air from the fans $i$, and will be blown rearward and through the nozzles J onto the plants. The hand-wheel R is provided at its periphery with a series of evenly-spaced notches, $r$, which may be marked or graduated in any suitable manner on the face of the wheel, and a pawl, $r'$, pivoted to the adjacent hopper H, or it may be to any other suitable support, is adapted to engage any one of the notches $r$, and said pawl may be set by the notch-scale, so as to cause the hopper-valves O to distribute or pass any required quantity of the poison per acre, and at the same time the pawl securely locks the shaft and valves when they are once adjusted.

To prevent clogging of the poison in the hoppers, we provide each one with a bladed or winged agitator, S, which is journaled in a bearing within the hopper and in the hopper top or cap, and to the shaft of the agitator of each hopper is fixed a bevel gear-wheel, T, which is engaged by a bevel-pinion, U, fixed to a shaft, V, journaled in bracket bearings or bars $v$, fixed to the casings of the air-blast fans, and this shaft V carries a sprocket-wheel or pinion, $w$, from which a driving-chain, W, passes to a sprocket-wheel, X, which is arranged on a clutch-sleeve, Y, fitted on the sulky-axle A, next the sulky-wheel B', and in a manner allowing it to be engaged with or disengaged from a clutch on this sulky-wheel by a lever, Z, fulcrumed to the frame E and engaging the clutch-sleeve Y, and in reach of the driver on the seat D, who may, by operating the lever, engage the clutches to cause rotation of the agitators in the poison-hoppers while the poison is being distributed in the field, or to disengage the clutches to allow the agitators to rest while the machine is being drawn to and from the field.

If preferred, the sprocket-wheel M and the other sulky-wheel, B, may be fitted with clutch devices and a clutch-shifting lever, substantially like those above described, for gearing and ungearing the agitators to and from the wheel B', and as will readily be understood.

Having thus described our invention, what we claim as new, and desire to secure by Letters Patent, is—

1. The combination, in a poison-distributer, of an air-blast apparatus, a hopper for holding the poison and conducting it to the air-blast pipe, and an axially-adjustable bent discharge-nozzle fitted to said pipe, substantially as described, for the purposes set forth.

2. The combination, in a poison-distributer, of an air-blast apparatus, a hopper for holding the poison, and fitted with a valve controlling discharge of the poison into an air-blast pipe, and an agitator operating in the hopper to prevent clogging of the poison therein, substantially as herein set forth.

3. The combination, in a poison-distributer, of a sulky air-blast apparatus mounted thereon, a series of hoppers for holding the poison and discharging it into the air-blast pipes, a series of agitators journaled in the hoppers, a shaft to which all the fans are fixed, and belt-and-wheel connections from said shaft to one of the sulky-wheels, a shaft geared with the agitators of all the hoppers, and belt-and-wheel connections from said shaft to one of the sulky-wheels, substantially as described, for the purposes set forth.

4. The combination, in a poison-distributer, of a sulky, a series of air-blast fans thereon, a corresponding series of hoppers for holding poison and discharging it into the air-blast pipes, a shaft common to all the air-blast fans, and belt-and-wheel connections from said shaft to one of the sulky-wheels, substantially as herein set forth.

5. The combination, in a poison-distributer, of a sulky, a series of air-blast fans thereon, a corresponding series of hoppers for holding poison, and provided each with a valve controlling passage of poison to an air-blast pipe, and a worm-shaft connecting with all the hopper-valves to actuate them simultaneously, substantially as herein set forth.

6. In a poison-distributer, the combination, with one or more hoppers for holding poison, and having a discharge-opening, of a pivoted valve fitted to said opening, a worm-shaft to which the valve or valves of the hopper or hoppers connect, a notched hand-wheel on the shaft, and a pawl engaging the notches of said wheel, substantially as described, for the purposes set forth.

7. The combination, in a poison-distributer, of a sulky, three air-blast fans thereon, a poison-hopper communicating with the blast-pipe of each fan, a rearwardly-discharging nozzle on the blast-pipe of the central fan, and a bent nozzle fitted to each of the side blast-pipes and adapted to discharge poison to both sides of the machine, substantially as herein set forth.

GEORGE R. BROWN.
JOHN W. BROWN.

Witnesses:
R. S. GALBRAITH,
R. M. BROWN.